(12) United States Patent
Sundararajan et al.

(10) Patent No.: US 11,707,780 B2
(45) Date of Patent: Jul. 25, 2023

(54) FORMATION OF SPRAY BASED THREE-DIMENSIONAL PRINTING OBJECT USING MAGNETIC FLUID

(71) Applicant: INTERNATIONAL BUSINESS MACHINES CORPORATION, Armonk, NY (US)

(72) Inventors: Mukundan Sundararajan, Bangalore (IN); Sarbajit K. Rakshit, Kolkata (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 165 days.

(21) Appl. No.: 17/303,975

(22) Filed: Jun. 11, 2021

(65) Prior Publication Data

US 2022/0395895 A1   Dec. 15, 2022

(51) Int. Cl.
| | | |
|---|---|---|
| *B29C 64/393* | (2017.01) | |
| *B22D 27/02* | (2006.01) | |
| *B22F 5/00* | (2006.01) | |
| *G06N 20/00* | (2019.01) | |
| *B29C 33/38* | (2006.01) | |
| *G06N 5/02* | (2023.01) | |
| *B33Y 10/00* | (2015.01) | |
| *B33Y 50/02* | (2015.01) | |
| *B33Y 80/00* | (2015.01) | |

(52) U.S. Cl.
CPC .............. *B22D 27/02* (2013.01); *B22F 5/007* (2013.01); *B29C 33/3857* (2013.01); *B29C 64/393* (2017.08); *G06N 5/02* (2013.01); *G06N 20/00* (2019.01); *B22F 2202/05* (2013.01); *B33Y 10/00* (2014.12); *B33Y 50/02* (2014.12); *B33Y 80/00* (2014.12)

(58) Field of Classification Search
CPC .................................................... B29C 64/393
See application file for complete search history.

(56) References Cited

U.S. PATENT DOCUMENTS

| | | | |
|---|---|---|---|
| 8,412,588 B1 * | 4/2013 | Bodell | ............... G06Q 30/0643 706/919 |
| 2015/0050179 A1 | 2/2015 | Hawes | |
| 2016/0151939 A1 | 6/2016 | Kisailus | |

(Continued)

OTHER PUBLICATIONS

Brainiac 75, "Monster magnet meets magnetic fluid . . . ," YouTube, Jan. 27, 2017, 3 pages, https://www.youtube.com/watch?app=desktop&v=L8cCvAITGWM.

(Continued)

*Primary Examiner* — Suresh Suryawanshi
(74) *Attorney, Agent, or Firm* — Elliot J. Shine

(57) ABSTRACT

A method, computer system, and a computer program product for object modeling is provided. The present invention may include generating a temporary modeling structure based on at least a digital model and one or more printing preferences. The present invention may include sending printing instructions to a 3D printer based on the temporary modeling structure. The present invention may include receiving feedback from a sensory based system, the sensory based system monitoring a printing chamber of the 3D printer. The present invention may include updating the printing instructions based on an analysis of the feedback of the feedback received from the sensory based system.

20 Claims, 6 Drawing Sheets

(56) References Cited

U.S. PATENT DOCUMENTS

| | | | | |
|---|---|---|---|---|
| 2016/0236414 | A1* | 8/2016 | Reese | B33Y 50/02 |
| 2018/0158604 | A1* | 6/2018 | Craft et al. | B22F 5/007 |
| | | | | 419/38 |
| 2018/0304550 | A1* | 10/2018 | Atherton | G05B 19/29 |
| 2018/0311757 | A1* | 11/2018 | Bucknell | B22F 12/90 |
| 2020/0143006 | A1* | 5/2020 | Matusik | B29C 64/393 |
| 2021/0078259 | A1* | 3/2021 | Tobia | B22F 10/80 |
| 2021/0362408 | A1* | 11/2021 | DeKam | C09D 5/23 |

OTHER PUBLICATIONS

Falahati et al., "Fabrication of polymeric lenses using magnetic liquid molds," Appl. Phys. Lett. 114, pp. 203701 to 203701-5, (2019), May 20, 2019, https://doi.org/10.1063/1.5090511.

Latikka et al., "Wetting of ferrofluids: phenomena and control," Elsevier, ScienceDirect, Current Opinion in Colloid & Interface Science (2018) 36, pp. 118-129.

Lazarus et al., "Creating 3D Printed Magnetic Devices with Ferrofluids and Liquid Metals." Additive Manufacturing, vol. 26, Mar. 2019, pp. 15-21, 2 pages.

Material Sample Shop, "Photopolymer—Liquid that rapidly solidifies when exposed to UV light," [accessed Apr. 7, 2021], Retrieved from the Internet: https://www.materialsampleshop.com/products/photopolymer, 2 pages.

Mell et al., "The NIST Definition of Cloud Computing," National Institute of Standards and Technology, Special Publication 800-145, Sep. 2011, pp. 1-7.

Mishriki et al., "Rapid Magnetic 3D Printing of Cellular Structures with MCF-7 Cell Inks," AAAS Research, vol. 2019, Article ID 9854593, Feb. 4, 2019, 13 pages, https://doi.org/10.34133/2019/9854593.

Seibold et al., "Fluid Equilibrium—Material Computation in Ferrofluidic Castings," ACADIA, 2018, pp. 250-258, https://research.gsd.harvard.edu/maps/files/2018/11/Fluid-Equilibrium_ACADIA-2018-Proceedings.pdf.

Sigma Hi-Chemical Inc., "Magnetic Fluid," [accessed Apr. 7, 2021], Retrieved from the Internet: http://www.sigma-nc.co.jp/english/magnetic_fluid.html, 2 pages.

Technopolis Stream, "Magnetic Fluid," Instructables Workshop, [accessed Apr. 7, 2021], Retrieved from the Internet: https://www.instructables.com/Magnetic-Fluid/, 9 pages.

Wikipedia, "Polyurethane," Wikipedia.org, [accessed Apr. 7, 2021], Retrieved from the Internet: https://en.wikipedia.org/wiki/Polyurethane, 8 pages.

* cited by examiner

FORMATION OF SPRAY BASED THREE-DIMENSIONAL PRINTING OBJECT USING MAGNETIC FLUID

BACKGROUND

The present invention relates generally to the field of computing, and more particularly to three-dimensional printing.

Three-Dimensional (3D) printing, also known as Additive Manufacturing, may enable the construction of a three-dimensional object from a computer-aided design (CAD) model or a digital 3D model. 3D printing may refer to a variety of processes in which material may be deposited, joined, or solidified under computer control to create a three-dimensional object. 3D printing may be limited to materials such as, but not limited to, metals or plastics, which may allow for sufficient temperature control to allow for 3D printing. Additionally, 3D printing parts may be produced layer-by-layer, although these layers may adhere together it may also allow for the layers to delaminate under certain stresses, orientations, and/or conditions.

Furthermore, restricted print chambers may restrict the size of parts that may be printed. Larger parts may need to be printed in separate parts and joined together following production.

SUMMARY

Embodiments of the present invention disclose a method, computer system, and a computer program product for object modeling. The present invention may include generating a temporary modeling structure based on at least a digital model and one or more printing preferences. The present invention may include sending printing instructions to a 3D printer based on the temporary modeling structure. The present invention may include receiving feedback from a sensory based system, the sensory based system monitoring a printing chamber of the 3D printer. The present invention may include updating the printing instructions based on an analysis of the feedback of the feedback received from the sensory based system.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
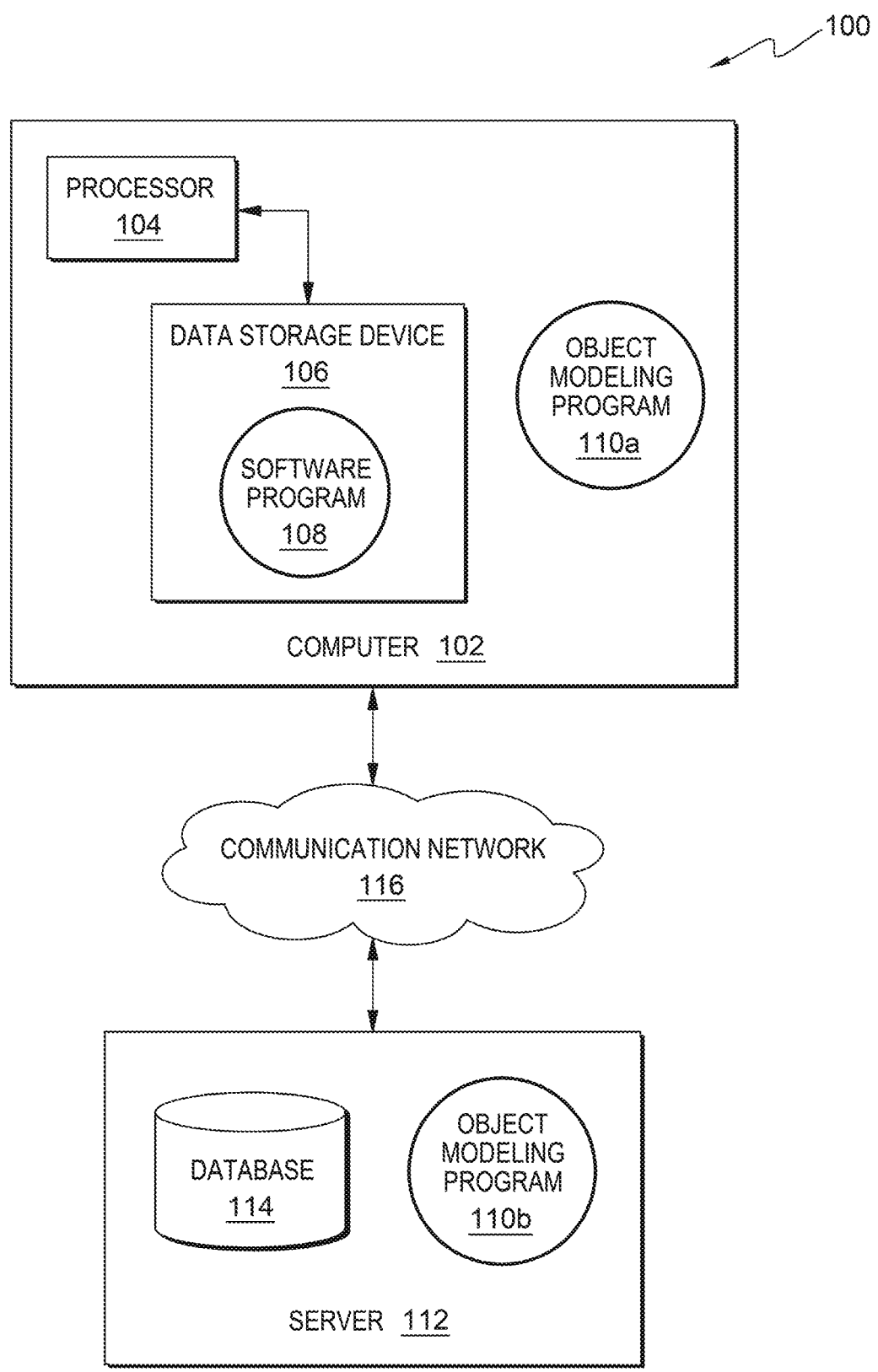
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for object modeling. As such, the present embodiment has the capacity to improve the technical field of 3D printing by generating a temporary modeling structure comprised of magnetic fluid. More specifically, the present invention may include generating a temporary modeling structure based on at least a digital model and one or more printing preferences. The present invention may include sending printing instructions to a 3D printer based on the temporary modeling structure. The present invention may include receiving feedback from a sensory based system, the sensory based system monitoring a printing chamber of the 3D printer. The present invention may include updating the printing instructions based on an analysis of the feedback of the feedback received from the sensory based system.

As described previously, Three-Dimensional (3D) printing, also known as Additive Manufacturing, may enable the construction of a three-dimensional object from a computer-aided design (CAD) model or a digital 3D model. 3D printing may refer to a variety of processes in which material may be deposited, joined, or solidified under computer control to create a three-dimensional object. 3D printing may be limited to materials such as, but not limited to, metals or plastics, which may allow for sufficient temperature control to allow for 3D printing. Additionally, 3D printing parts may be produced layer-by-layer, although these layers may adhere together it may also allow for the layers to delaminate under certain stresses, orientations, and/or conditions.

Furthermore, restricted print chambers may restrict the size of parts that may be printed. Larger parts may need to be printed in separate parts and joined together following production.

Therefore, it may be advantageous to, among other things, generate a temporary modeling structure based on at least a digital model and one or more printing preferences, send printing instructions to a 3D printer based on the temporary modeling structure, receive feedback from a sensory based system, the sensory based system monitoring a printing chamber of the 3D printer, and update the printing instructions based on an analysis of the feedback received from the sensory based system, wherein the feedback is analyzed by a supervised machine learning model.

According to at least one embodiment, the present invention may improve the printing of complex 3D models by generating a temporary modeling structure based on at least a digital model and one or more printing preferences, wherein the temporary modeling structure is comprised of magnetic fluid.

According to at least one embodiment, the present invention may improve the structural strength of 3D models by using a machine learning model to updating the printing instructions based on an analysis of feedback received from a sensory based system enabling continuous printing of a 3D model, avoiding the structural strength drawbacks of soldering and/or other means of joining parts of a 3D model together.

According to at least one embodiment, the present invention may improve post processing of 3D models by utilizing a solidifying material to retain the shape and smooth surface texture of the 3D model.

According to at least one embodiment, the present invention may improve the amount and types of materials utilized in 3D printing by dynamically shaping a magnetic fluid using a magnetic field created by determining an electrical current strength by which to charge each connected magnetic coil of one or more magnets.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an object modeling program 110a. The networked computer environment 100 may also include a server 112 that is enabled to run an object modeling program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the object modeling program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the object modeling program 110a, 110b (respectively) to dynamically print a 3D model utilizing a temporary modeling structure comprised of magnetic fluid. The object modeling method is explained in more detail below with respect to FIGS. 2 and 3.

Figure 2:
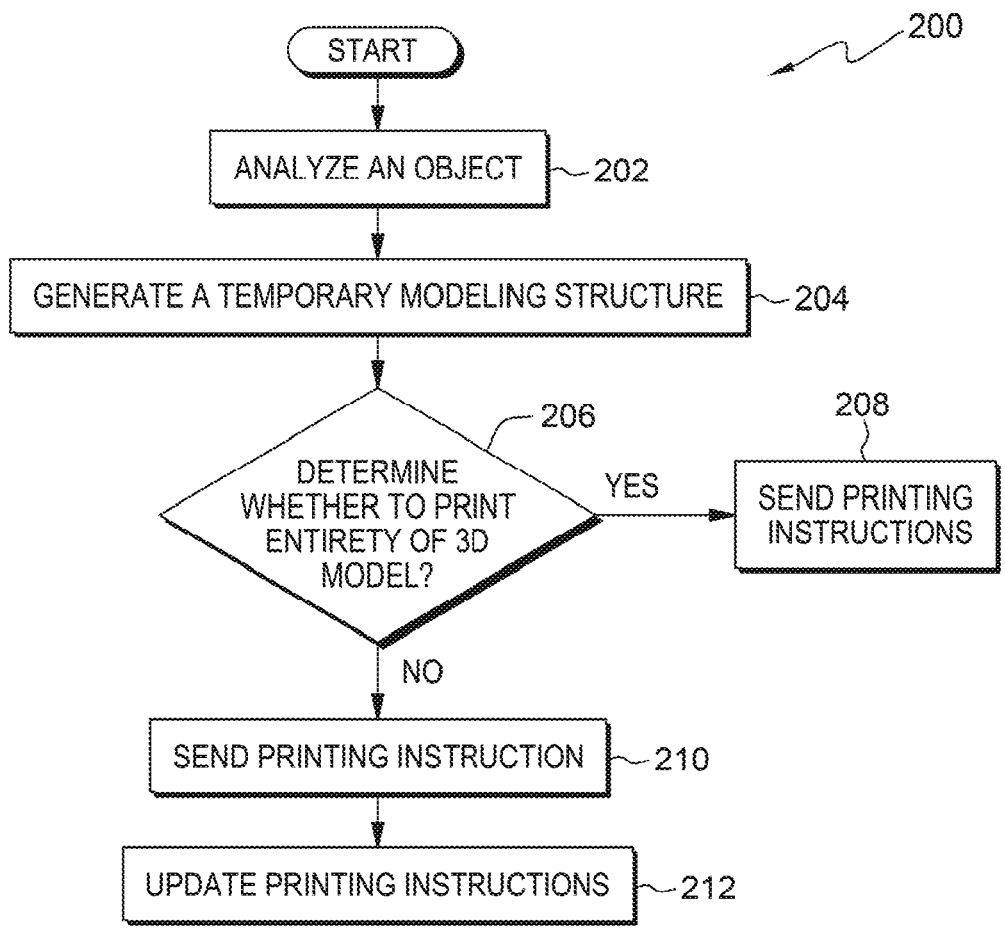
FIG. 2 is an operational flowchart illustrating a process for object modeling according to at least one embodiment.

Referring now to FIG. 2, an operational flowchart illustrating the exemplary object modeling process 200 used by the object modeling program 110a and 110b according to at least one embodiment is depicted.

At 202, the object modeling program 110 analyzes an object. The object may be received from a client and/or user. The object may be a real object in which a digital model is to be generated for printing. The object modeling program 110 may analyze the object using a computer-aided design (CAD) package, such as, but not limited to a 3D scanner, and/or using a camera and photogrammetry software. 3D scanning may be a process by which digital data on at least the shape, texture, and appearance of a real object is collected and creates the digital model based on it.

In another embodiment, the object modeling program 110 may receive the digital model directly from the client and/or user. The digital model may be saved in one or more different file formats, including, but not limited to, stereolithography file format (STL), Additive Manufacturing File format (AMF), Virtual Reality Modeling Language (VRML), OBJ file format, Polygon File Format (PLY), G-code format, amongst others.

The object modeling program 110 may receive one or more printing preferences with respect to the object and/or digital model file from the client and/or user. Printing preferences may include, but is not limited to including, specifications of a 3D printer, materials to be used, structural strength requirements, amongst others. The one or more printing preferences received from the client may refer to a 3D printer the client intends to use in producing a 3D model, the materials the client intends to use, and the strength requirements of the 3D model the client is requesting.

Specifications of the 3D printer may include, but are not limited to including, print chamber dimensions, 3D printer make and model, nozzle dimensions, nozzle materials, amongst other specifications. The print chamber dimensions may refer to space available for a 3D printer to print the digital model, wherein the width and length dimensions may be the surface area of a print bed. The print bed may be the part of the 3D printer in which the 3D printed object rests during the printing process.

The materials to be used for the printing of the 3D model from the digital model may also be provided by the client and/or user. Materials utilized in the printing of the 3D model may include but are not limited to including, Acrylonitrile Butadiene Styrene (ABS), Polylactic Acid (PLA), Polyvinyl Alcohol (PVA), High-density polyethylene (HDPE), Wood Filament, Sandstone, ceramics, metal filaments, carbon fiber mix, amongst others.

Structural strength requirements of the 3D model may refer to the required load in which the 3D model is able to withstand. The client and/or may specify critical parts of the 3D model which necessitate different structural strength requirements or one or more use cases for the 3D model. The object modeling program 110 may determine the structural strength requirements of the 3D model based on the one or more use cases of the 3D model.

At 204, the object modeling program 110 generates a temporary modeling structure. The object modeling program 110 may generate the temporary modeling structure based on the digital model and the one or more printing preferences. The temporary modeling structure may be generated using a magnetic fluid. The temporary modeling structure may be a template which may be utilized by a 3D printer for printing the 3D model. The magnetic fluid may be comprised of at least a base liquid, ferromagnetic particles, and a chemically adsorbed surfactant. The object modeling program 110 may utilize an electrical current to charge each connected magnetic coil of one or more magnets to generate the temporary modeling structure by shaping the magnetic fluid. The magnetic fluid may be shaped according to the magnetic field created by the electrical current used to charge each connected magnetic coil of the one or more magnets.

In an embodiment, the magnetic coils of the one or more magnets may be external to the 3D printer, such that the magnetic coils surround the print chamber of the 3D printer. The magnetic fluid may be fed into the print chamber of the 3D printer and the object modeling program 110 may utilize an electrical current to charge each connected magnetic coil of the one or more magnets creating a magnetic field which may shape the magnetic fluid, generating the temporary modeling structure.

In another embodiment, the magnetic coils of the one or more magnetics may surround a closed space where a printed component is required. For example, where machinery may not be dismantled, the magnetic coils may surround the closed spaces where the printed component is to be used as a replacement component. A 3D printer nozzle may be sent into the closed space along with associated electronics and/or feed pipes and the magnetic fluid may be shaped within the closed space to generate the temporary modeling structure by which the replacement component may be printed.

The object modeling program 110 may determine a strength of the electrical current for each magnetic coil based on a machine learning model. The machine learning model may be trained based on a plurality of training data. The training data may include, but is not limited to including, sample digital models with varying printing preferences. The object modeling program 110 may utilize a camera and/or sensor based system in providing feedback to the machine learning model and/or storing temporary modeling structure data in a knowledge corpus (e.g., database 114). The trained machine learning model may be able to determine the magnetic fields required in order to generate the temporary modeling structure for the digital model according to the printing preferences using the temporary modeling structure data stored in the knowledge corpus (e.g., database 114).

The machine learning model may utilize the digital model and the printing preferences to determine the electrical current in which to charge each magnetic coil of the one or more magnets. The object modeling program 110 may generate the temporary modeling structure using the electrical current charge determined by the machine learning model for each magnetic coil of the one or more magnets.

The machine learning model may also analyze the digital model and printing preferences to determine whether the temporary modeling structure is to be printed in its entirety or is to be printed in parts. The object modeling program 110 may determine whether the temporary modeling structure is to be printed in its entirety or in parts based on at least, the materials to be used, the structural strength requirements, the 3D printing chamber dimensions, amongst others. For example, if the digital model to be printed is larger than the 3D printing chamber dimensions the object modeling program 110 will generate parts of the temporary modeling structure. The object modeling program 110 may generate parts of the temporary modeling structure to meet the structural strength requirements. The object modeling program 110 may also provide feedback and/or recommendations to a user and/or client based on the machine learning model.

For example, training data 1 and training data 2 may both be a digital model of the same shape and size, such as a cogwheel. The printing preferences for training data 1 may differ from training data 2, for example, the specifications of the 3D printer, materials to be used, and structural strength requirements. Training data 1 may be for a cogwheel to be used in heavy machinery, requiring the use of steel and a high level of structural strength. Training data 2 may be for a cogwheel to be used in bicycles, the specifications of the 3D printer for the training data 2 may be a small printing chamber. The machine learning model may determine the electrical current to charge each magnetic coil of the one or more magnets to generate the temporary modeling structure for training data 1 and training data 2 by shaping the magnetic fluid. The object modeling program 110 store data about the magnetic fields utilized to shape the magnetic fluid in the knowledge corpus (e.g., database). The machine learning model may determine based on training data 2 for the cogwheel to be used in bicycles that the 3D printing chamber dimensions are too small to print the temporary modeling structure in its entirety, the object modeling program 110 may determine based on the structural strength requirements which parts should be printed together such that when the one or more parts are welded together the 3D model meets the structural strength requirements. If the machine learning model determines printing the 3D model in parts would not meet the structural strength requirements of training data 2, the object modeling program 110 may provide feedback and/or recommendation to the user and/or client, such as, a 3D printer model with different printing chamber dimensions, a substitute printing material that would meet the structural requirements, amongst others.

At 206, the object modeling program 110 determines whether a 3D model is to be printed in its entirety based on the temporary modeling structure. If the object modeling program 110 determine that the 3D model is to be printed in its entirety, then the object modeling program proceeds to step 208. If the object modeling program 110 determines the 3D model is to be printed in parts based on the temporary modeling structure, then the object modeling program proceeds to step 210.

If, at 206, the object modeling program 110 determined the 3D model is to be printed in its entirety, then at 208, the object modeling program 110 sends the printing instructions to the 3D printer and the object modeling program 110 ends. The object modeling program 110 will cease monitoring the printing process of the 3D model.

However, the object modeling program 110 may be capable of receiving feedback from the camera and/or sensory based system of the 3D printer. The object modeling program 110 may utilize the feedback to at least update the knowledge corpus (e.g., database 114) and retrain the machine learning model. The object modeling program 110 may also receive feedback from the client and/or user. The object modeling program 110 may utilize the feedback from the client to at least update the knowledge corpus (e.g., database 114) and retrain the machine learning model.

If, at 206, the object modeling program 110 determined the 3D model is to be printed in parts, then at 210, the object modeling program 110 sends printing instructions to the 3D printer. The object modeling program 110 may send the partial printing instructions for the 3D model to the 3D printer based on the temporary modeling structure. In this instance, the object modeling program 110 may receive feedback from the camera and/or sensory based system. The object modeling program 110 may monitor the printing process using the feedback from the camera and/or sensory based system.

At 212, the object modeling program 110 updates the printing instructions. The object modeling program 110 may update the printing instructions based on feedback received from the camera and/or sensory based system. The object modeling program may utilize a supervised machine learning model to analyze the feedback received from the camera and/or sensory based system.

The supervised machine learning model may be trained using sequences of images. The sequences of images may be at a defined time frequency. The sequences of images may be for different printing materials and whether the printing materials retain their shape. The supervised machine learning model learns whether the images represent a stable component with the required strength or requires more time. The supervised machine learning model may utilize one or more algorithms and/or computational techniques, such as, but not limited to, neural networks, support vector machine (SVM), k-nearest neighbor, naïve bayes, binary decision tree, and linear discriminant analysis, amongst others.

The object modeling program 110 may update the printing instructions and send the updated printing instructions to the 3D printer if the supervised machine learning model determines based on the feedback from the camera and/or sensory based system the printing material will retain shape. The camera and/or sensory based system may continue to provide feedback to the object modeling program 110 with respect to at least shape retention of the printed portion. The feedback may be one or more images of the printed portion of the 3D model over time, the one or more images may be stored in a knowledge corpus (e.g., database 114). The object modeling program 110 may utilize the feedback to retrain the supervised learning model.

For example, the object modeling program 110 may receive a digital model and one or more printing parameters from the client and/or user. The object modeling program 110 determines based on the temporary modeling structure the 3D model is to be printed in 3 parts, part 1 to be material 1, part 2 to be material 1, and part 3 to be material 2. The object modeling program 110 may utilize an electrical current to charge each connected magnetic coil of the one or more magnets surrounding the print chamber of the 3D printer to create a magnetic field shaping the magnetic fluid into the temporary modeling structure for part 1. The object modeling program 110 may then send the partial printing instructions to the 3D printer, the partial printing instructions here may be the printing instructions for part 1 of the 3D model. According to the printing instructions, the 3D printer will beginning printing part 1 of the 3D material in material 1 into or over the temporary modeling structure, the printing process being analyzed by the supervised machine learning model based on feedback received from the camera and/or sensory based system. The supervised machine learning model may determine the first half of part 1 is a stable component with the required strength to retain its shape based on images from the camera and/or sensory based system. The object modeling program 110 may update the partial printing instructions accordingly, such that the electrical current is adjusted, altering the charge of at least one of the connected magnetic coils of at least one magnet to incrementally collapse the magnetic fluid of the first half of part 1. The object modeling program 110 may further adjust the magnetic field such that the magnetic fluid of the first half of part 1 begins forming part 2 of the 3D model.

In another embodiment, the object modeling program 110 may utilize a solidifying material to retain the shape of the temporary modeling structure. The supervised machine learning model may determine whether to utilize the solidifying material based on the feedback from the camera and/or sensory based system. The supervised machine learning model may determine to utilize the solidifying material to retain the shape of the temporary modeling structure based on at least, the one or more materials being used for printing, the structural strength requirements, and/or a surface texture of the 3D model. For example, if the 3D model to be printed is to have a smooth surface texture, the object modeling program 110 may utilize the solidifying material to retain the shape and the smooth surface texture. The solidifying material may include, but is not limited to including, a photopolymer liquid, a plastic fluid or powder, amongst others. The solidifying material may be administered by the one or more nozzles of the 3D printer as a powder or liquid onto and/or into the temporary modeling structure. The object modeling program 110 may send instructions to utilize the solidifying material to the 3D printer. The printing instructions may instruct the 3D printer to print the 3D model over and/or into the temporary modeling structure as explained above.

Figure 3:
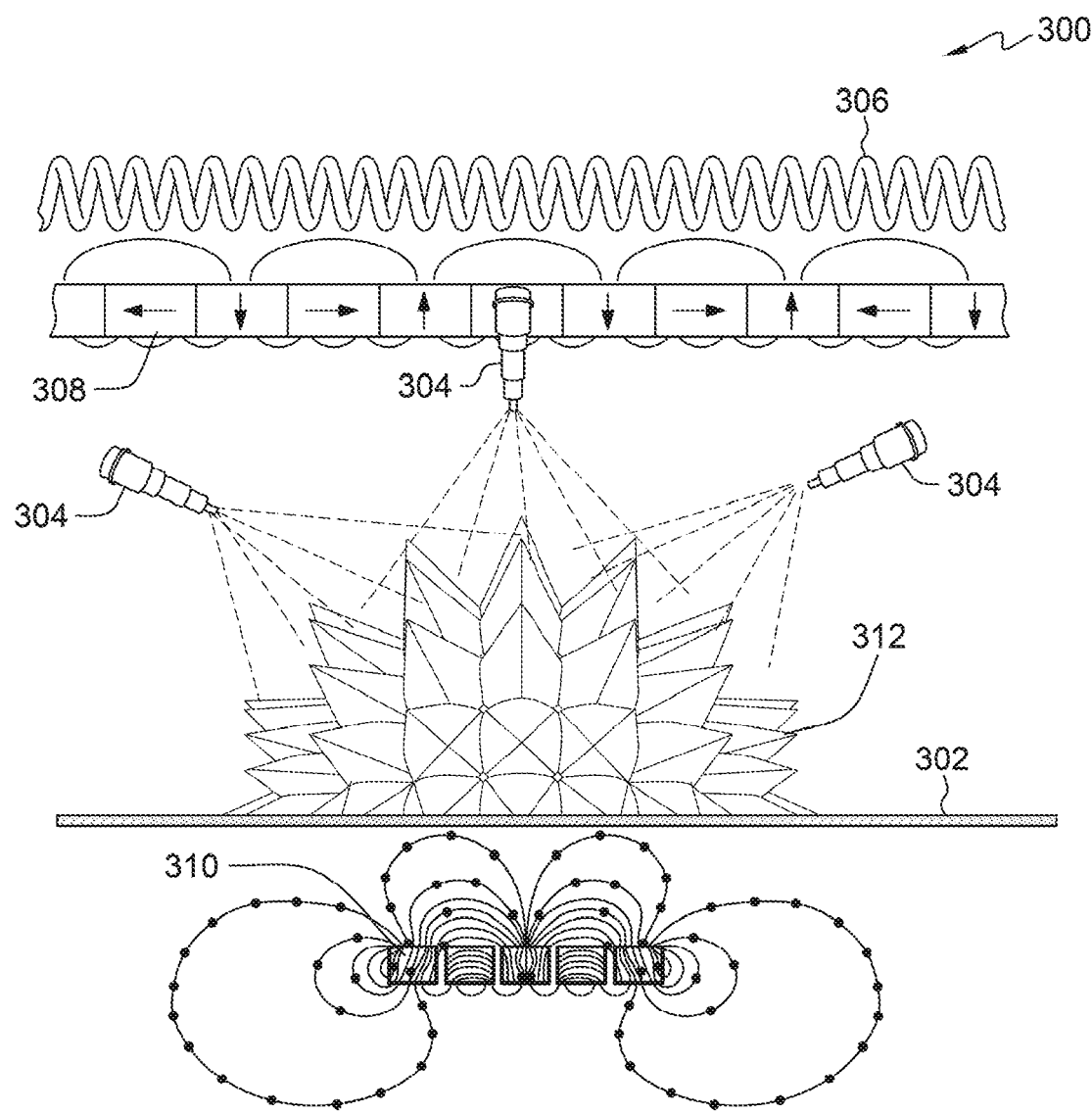
FIG. 3 illustrates an exemplary 3D printing chamber according to at least one embodiment.

Referring now to FIG. 3, an exemplary 3D printing chamber 300 according to at least one embodiment is depicted.

The printing chamber 300 may be utilized by the object modeling program 110 in generating the temporary modeling structure 312. The object modeling program 110 may generate the temporary modeling structure 312 based on the digital model of the one or more printing preferences.

In the exemplary 3D printing chamber 300 embodiment, the magnetic coils 306 of the one or more magnets 308 may be external to the 3D printing chamber, such that the magnetic coils 306 surround the printing chamber of the 3D printer. Magnetic fluid be fed into the printing chamber of the 3D printer and may settle on the print bed 302 of the printing chamber prior to the utilization of an electrical current by the object modeling program 110. The magnetic fluid may be comprised of at least a base liquid, ferromagnetic particles, and a chemically adsorbed surfactant.

The magnetic coil 306 of the one or more magnets 308 to generate the temporary modeling structure 312. The temporary modeling structure 312 shaped according to the magnetic field 310 created by the electrical current utilized to charge the magnetic coil 306 of the one or more magnets 308.

The object modeling program 110 may utilize a solidifying material, distributed by the one or more printing nozzles 304, to retain the shape of the temporary modeling structure 312 during the printing process.

It may be appreciated that FIGS. 2 and 3 provide only an illustration of one embodiment and do not imply any limitations with regard to how different embodiments may be implemented. Many modifications to the depicted embodiment(s) may be made based on design and implementation requirements.

Figure 4:
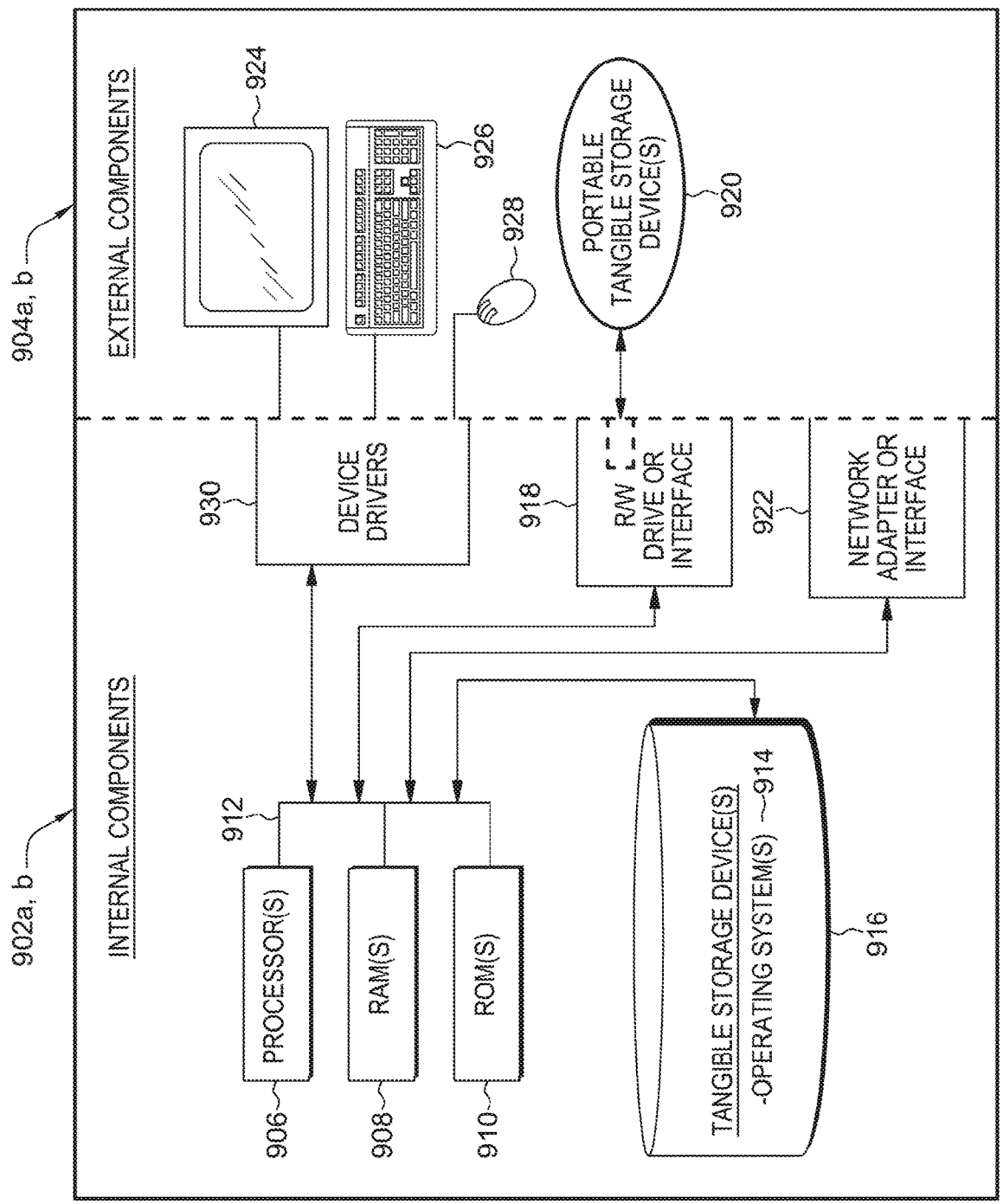
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 4. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the object modeling program 110a in client computer 102, and the object modeling program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the object modeling program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the object modeling program 110a in client computer 102 and the object modeling program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the object modeling program 110a in client computer 102 and the object modeling program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
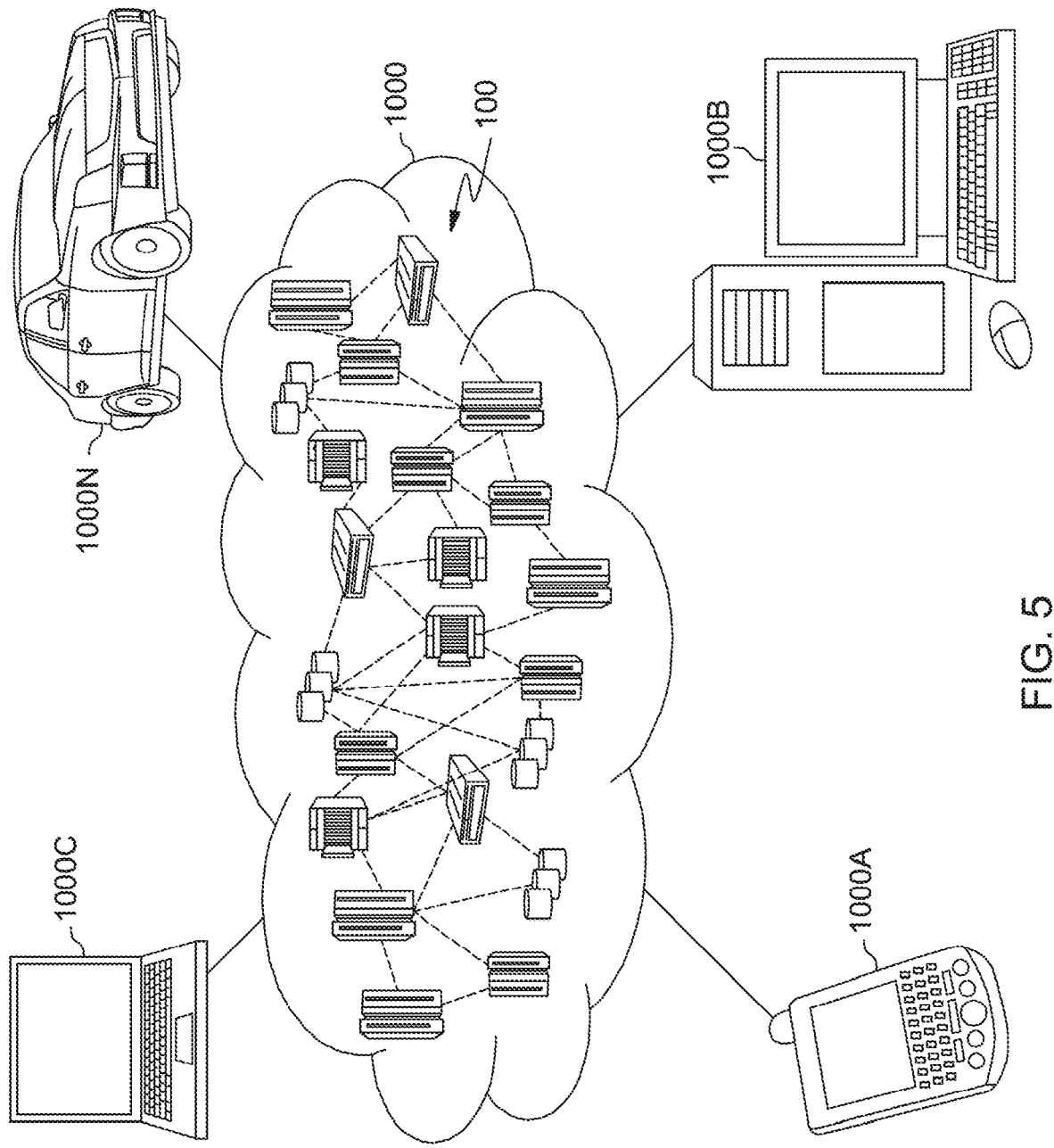
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
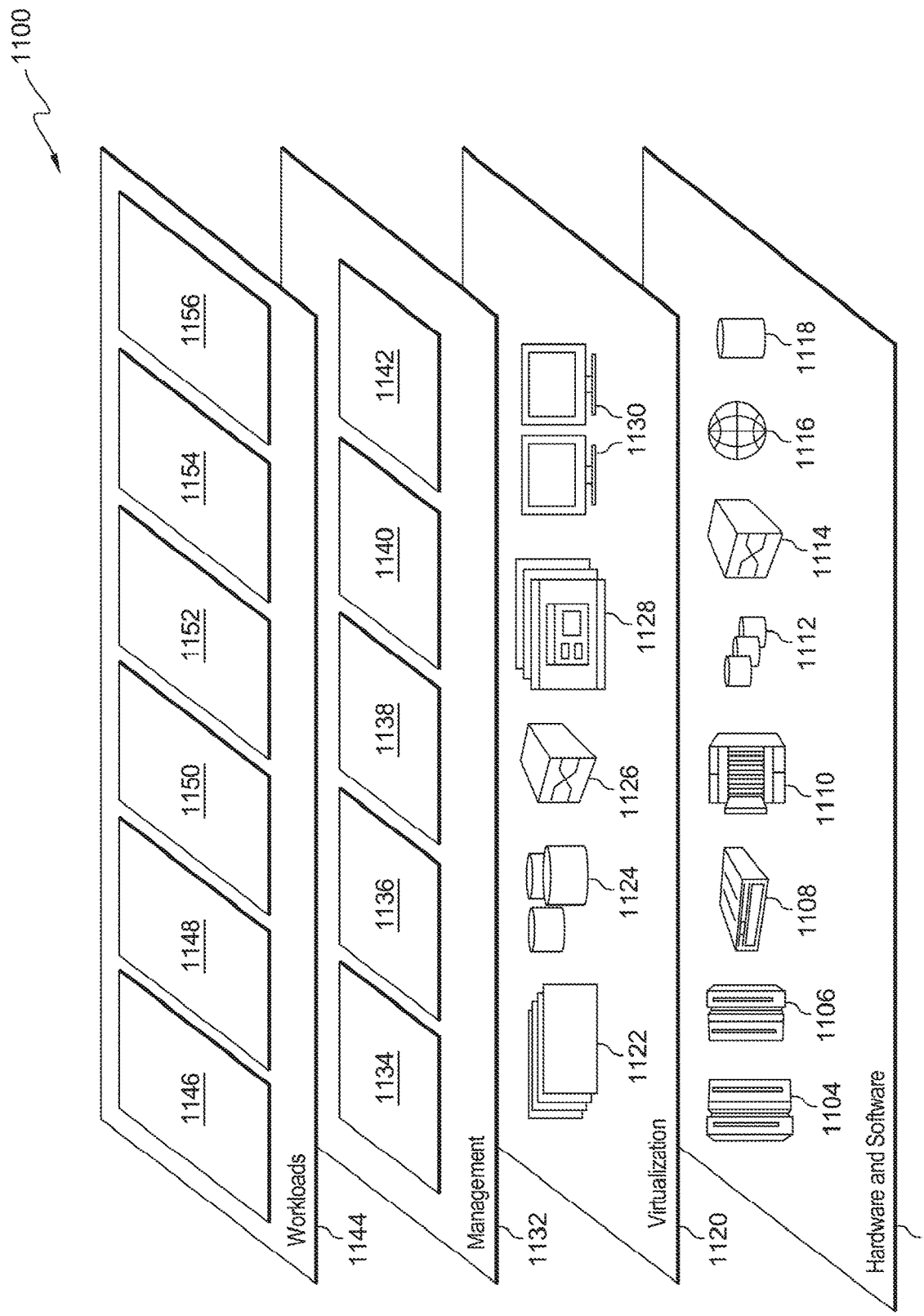
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and the object modeling program 1156. An object modeling program 110*a*, 110*b* provides a way to dynamically print 3D models.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for object modeling, the method comprising:
   generating a temporary modeling structure comprised of magnetic fluid, wherein the magnetic fluid is shaped into the temporary modeling structure using a magnetic field based on at least a digital model and one or more printing preferences;
   sending printing instructions to a 3D printer based on the temporary modeling structure;

receiving feedback from a sensory based system, the sensory based system monitoring a printing chamber of the 3D printer; and updating the printing instructions based on an analysis of the feedback, wherein the feedback is analyzed by a supervised machine learning model.

2. The method of claim 1, wherein the one or more printing preferences includes at least specifications of the 3D printer, materials to be used, and structural strength requirements.

3. The method of claim 1, wherein generating the temporary modeling structure further comprises:

determining an electrical current strength by which to charge each connected magnetic coil of one or more magnets to create the magnetic field, wherein the electrical current strength is determined by a machine learning model based on the digital model and the one or more printing preferences.

4. The method of claim 1, further comprising:

monitoring a printed portion of the 3D model using the sensory based system;

receiving feedback from the sensory based system, wherein the feedback received from the sensory based system is one or more images of the printed portion of the 3D model, the one or more images being stored in a knowledge corpus; and retraining the supervised machine learning model using the one or more images stored in the knowledge corpus.

5. The method of claim 1, wherein receiving feedback from the sensory based system further comprises:

receiving one or more images of a 3D model being printed according to the temporary modeling structure; and determining whether a printed portion of the 3D model will retain a shape of the temporary modeling structure using the supervised machine learning model, wherein the supervised learning model is trained using a sequence of images at a defined time frequency.

6. The method of claim 5, further comprising:

determining the printed portion of the 3D model will retain the shape of the temporary modeling structure; and adjusting an electrical current strength charged to at least one of the connected magnetic coils of at least one magnet to alter a magnetic field, wherein the magnetic field is altered to collapse the magnetic fluid of the printed portion of the 3D model and move the magnetic fluid to form an unprinted portion of the 3D model in accordance with the temporary modeling structure.

7. A computer system for object modeling, comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

generating a temporary modeling structure comprised of magnetic fluid, wherein the magnetic fluid is shaped into the temporary modeling structure using a magnetic field based on at least a digital model and one or more printing preferences;

sending printing instructions to a 3D printer based on the temporary modeling structure;

receiving feedback from a sensory based system, the sensory based system monitoring a printing chamber of the 3D printer;

updating the printing instructions based on an analysis of the feedback, wherein the feedback is analyzed by a supervised machine learning model.

8. The computer system of claim 7, wherein the one or more printing preferences includes at least specifications of the 3D printer, materials to be used, and structural strength requirements.

9. The computer system of claim 7, wherein generating the temporary modeling structure further comprises:

determining an electrical current strength by which to charge each connected magnetic coil of one or more magnets to create the magnetic field, wherein the electrical current strength is determined by a machine learning model based on the digital model and the one or more printing preferences.

10. The computer system of claim 7, further comprising:

monitoring a printed portion of the 3D model using the sensory based system;

receiving feedback from the sensory based system, wherein the feedback received from the sensory based system is one or more images of the printed portion of the 3D model, the one or more images being stored in a knowledge corpus; and retraining the supervised machine learning model using the one or more images stored in the knowledge corpus.

11. The computer system of claim 7, wherein receiving feedback from the sensory based system further comprises:

receiving one or more images of a 3D model being printed according to the temporary modeling structure; and determining whether a printed portion of the 3D model will retain a shape of the temporary modeling structure using the supervised machine learning model, wherein the supervised learning model is trained using a sequence of images at a defined time frequency.

12. The computer system of claim 11, further comprising:

determining the printed portion of the 3D model will retain the shape of the temporary modeling structure; and adjusting an electrical current strength charged to at least one of the connected magnetic coils of at least one magnet to alter a magnetic field, wherein the magnetic field is altered to collapse the magnetic fluid of the printed portion of the 3D model and move the magnetic fluid to form an unprinted portion of the 3D model in accordance with the temporary modeling structure.

13. A computer program product for object modeling, comprising:

one or more non-transitory computer-readable storage media and program instructions stored on at least one of the one or more tangible storage media, the program instructions executable by a processor to cause the processor to perform a method comprising:

generating a temporary modeling structure comprised of magnetic fluid, wherein the magnetic fluid is shaped into the temporary modeling structure using a magnetic field based on at least a digital model and one or more printing preferences;

sending printing instructions to a 3D printer based on the temporary modeling structure;

receiving feedback from a sensory based system, the sensory based system monitoring a printing chamber of the 3D printer;

updating the printing instructions based on an analysis of the feedback, wherein the feedback is analyzed by a supervised machine learning model.

14. The computer program product of claim 13, wherein the one or more printing preferences includes at least specifications of the 3D printer, materials to be used, and structural strength requirements.

15. The computer program product of claim 13, wherein generating the temporary modeling structure further comprises:
determining an electrical current strength by which to charge each connected magnetic coil of one or more magnets to create the magnetic field, wherein the electrical current strength is determined by a machine learning model based on the digital model and the one or more printing preferences.

16. The computer program product of claim 13, further comprising:
monitoring a printed portion of the 3D model using the sensory based system;
receiving feedback from the sensory based system, wherein the feedback received from the sensory based system is one or more images of the printed portion of the 3D model, the one or more images being stored in a knowledge corpus; and
retraining the supervised machine learning model using the one or more images stored in the knowledge corpus.

17. The computer program product of claim 13, wherein receiving feedback from the sensory based system further comprises:
receiving one or more images of a 3D model being printed according to the temporary modeling structure; and
determining whether a printed portion of the 3D model will retain a shape of the temporary modeling structure using the supervised machine learning model, wherein the supervised learning model is trained using a sequence of images at a defined time frequency.

18. The computer program product of claim 17, further comprising:
determining the printed portion of the 3D model will retain the shape of the temporary modeling structure; and
adjusting an electrical current strength charged to at least one of the connected magnetic coils of at least one magnet to alter a magnetic field, wherein the magnetic field is altered to collapse the magnetic fluid of the printed portion of the 3D model and move the magnetic fluid to form an unprinted portion of the 3D model in accordance with the temporary modeling structure.

19. The method of claim 5, further comprising:
determining the printed portion of the 3D model will not retain the shape of the temporary modeling structure;
utilizing a solidifying material to retain the shape of the temporary modeling structure based on at least one or more of materials being used for printing, structural strength requirements, and a surface texture of the 3D model.

20. The method of claim 5, wherein the supervised machine learning model uses the sequence of images at the defined time frequency including different printing materials to learn whether an image represents a stable component in accordance with structural strength requirements of the digital model.

* * * * *